US009919713B2

(12) United States Patent
Sautter

(10) Patent No.: US 9,919,713 B2
(45) Date of Patent: Mar. 20, 2018

(54) ACTUATOR SYSTEM FOR SELF-DRIVING VEHICLES

(71) Applicant: Robert Bosch GmbH, Stuttgart (DE)

(72) Inventor: Peter Sautter, Lauffen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/223,430

(22) Filed: Jul. 29, 2016

(65) Prior Publication Data
US 2017/0028992 A1 Feb. 2, 2017

(30) Foreign Application Priority Data
Jul. 30, 2015 (DE) .................. 10 2015 214 521

(51) Int. Cl.
| | |
|---|---|
| *B60W 50/023* | (2012.01) |
| *B60W 10/20* | (2006.01) |
| *B60W 10/18* | (2012.01) |
| *G05D 1/00* | (2006.01) |
| *B62D 5/04* | (2006.01) |
| *B60W 10/184* | (2012.01) |

(52) U.S. Cl.
CPC .......... *B60W 50/023* (2013.01); *B60W 10/18* (2013.01); *B60W 10/184* (2013.01); *B60W 10/20* (2013.01); *B62D 5/04* (2013.01); *G05D 1/0077* (2013.01); *G05D 1/0088* (2013.01); *G05D 2201/0213* (2013.01)

(58) Field of Classification Search
CPC .... B60W 50/023; B60W 10/18; B60W 10/20; G05D 1/0088
USPC .......................................................... 701/23
See application file for complete search history.

(56) References Cited

U.S. PATENT DOCUMENTS

| | | | | |
|---|---|---|---|---|
| 2005/0228546 | A1* | 10/2005 | Naik | ....................... B60T 8/885 701/1 |
| 2007/0005203 | A1* | 1/2007 | Sundaram | ............. B60W 10/18 701/31.4 |
| 2015/0033054 | A1* | 1/2015 | Armbruster | ........... G06F 1/3287 713/323 |

\* cited by examiner

*Primary Examiner* — Brian P Sweeney
(74) *Attorney, Agent, or Firm* — Norton Rose Fulbright US LLP; Gerard Messina

(57) ABSTRACT

An actuator system for a vehicle is described that includes a first steering actuator, operated on a first on-board network of the vehicle, a first steering actuator control unit, operated on the first on-board network, for controlling the first steering actuator, and a second steering actuator, operated on a second on-board network of the vehicle that is designed to be redundant in relation to the first on-board network. In addition, the actuator system includes a brake actuator device, operated on the second on-board network of the vehicle, having a brake actuator and a brake actuator control unit for controlling the brake actuator. The brake actuator device includes in addition a second steering actuator control unit, operated on the second on-board network of the vehicle, for controlling the second steering actuator.

10 Claims, 4 Drawing Sheets

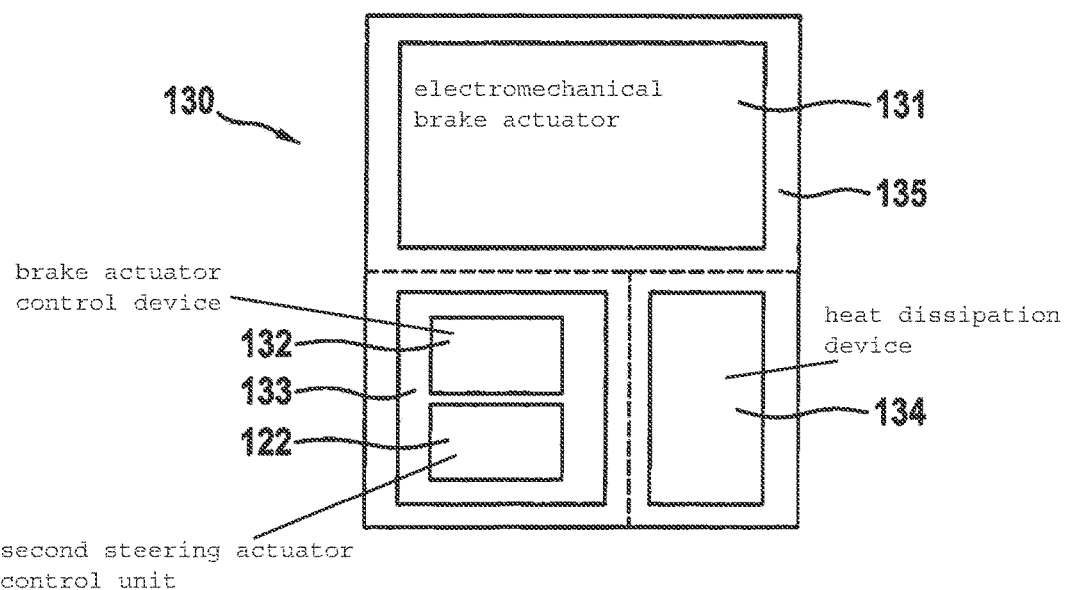
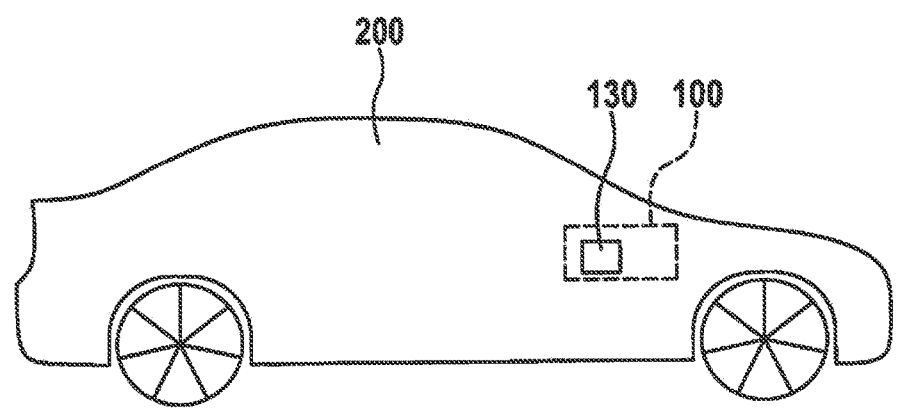

ACTUATOR SYSTEM FOR SELF-DRIVING VEHICLES

CROSS REFERENCE

The present application claims the benefit under 35 U.S.C. § 119 of German Patent Application No. DE 102015214521.2 filed on Jul. 30, 2015, which is expressly incorporated herein by reference in its entirety.

FIELD

The present invention relates to an actuator system for a vehicle, including two steering actuators designed to be redundant relative to one another and a brake actuator device fashioned in the form of a plug-in module that includes the control unit of one of the steering actuators. The present invention further relates to a brake actuator device for such an actuator system, and to a vehicle having a corresponding actuator system.

BACKGROUND INFORMATION

Modern vehicles have a large number of assistance systems that support the vehicle driver in particular driving situations, and are even capable of actively intervening in the guiding of the vehicle. A goal of present development in the automotive field is the development of autonomously driving vehicles, where the guiding of such a vehicle is to take place completely without a human driver. In order to enable such autonomous or self-sufficient driving, vehicle functions such as braking or steering must be designed so as to be fail-operational. Here, fail-operational means that the corresponding system continues to operate in case of error without going into an error state that would mean the complete failure of the respective function. In order to achieve this, the corresponding systems are designed to be redundant, the respective function, such as braking or steering, being carried out by at least two devices that are operated independently of one another. An independent operation of two electrical devices also requires that the two devices be operated on different on-board networks that are independent of one another. In order to design for example the steering function for fail-operational operation, two steering actuators connected to on-board networks that are independent of one another, each having their own control systems, are thus required.

SUMMARY

Currently, for steering, an actuator that is completely fail-operational does not exist. For the brakes, modules are available, such as the iBooster of Robert Bosch GmbH, that use an electrically driven actuator as a replacement for a conventional mechanical brake booster. These modules can in principle be used as second actuators for fail-operational operation. Because no device currently exists that has fail-operational properties both for braking and for steering, currently fail-operational operation can be realized only by installing additional devices. However, the number of additional devices in the vehicle should be kept as low as possible in order to facilitate assembly.

An object of the present invention is therefore to equip the infrastructure of a conventional vehicle for fail-operational operation with as low an outlay as possible. This object may be achieved by an actuator system in accordance with the present invention. In addition, the object may be achieved by a brake actuator device, and by a vehicle, in accordance with the present invention.

According to the present invention, an actuator system for a vehicle is provided that includes a first steering actuator, operated on a first on-board network of the vehicle, and a first steering actuator control unit, operated on the first on-board network, for controlling the first steering actuator. The actuator system further includes a second steering actuator, operated on a second on-board network of the vehicle designed to be redundant to the first on-board network, and a brake actuator device, operated on the second on-board network of the vehicle, having a brake actuator and a brake actuator control unit for controlling the brake actuator. Here, the brake actuator device further includes a second steering actuator control unit, operated on the second on-board network of the vehicle, for controlling the second steering actuator. Due to the configuration of the second steering actuator inside the brake control device, the number of devices to be installed can be reduced. In this way, assembly expense is also reduced. In addition, with the installation of such a brake actuator device it is possible to prepare a conventional vehicle for automatic driving relatively easily.

In a specific embodiment of the present invention, it is provided that the brake actuator device includes a housing that accommodates the brake actuator and the brake actuator control unit assigned to the brake actuator. The steering actuator control unit is situated inside the housing.

Through the installation of the steering actuator control unit in the housing of the brake actuator device, the assembly expense when upgrading the vehicle can be significantly reduced. Through the use of a common housing for the brake actuator device and the steering actuator control unit, the space requirement inside the vehicle is also reduced.

In a further specific embodiment, it is provided that the second steering actuator control unit is fashioned at least partly integrally with the brake actuator control unit assigned to the brake actuator. Through this partial integration of the two control devices, synergistic effects result that enable, inter alia, a lower-cost manufacture, lower weight, and a smaller space requirement.

According to a further specific embodiment, it is provided that the second steering actuator control unit and the brake actuator control unit each have a separate power electronics system, and that the power electronics system of the second steering actuator control unit and the power electronics system of the brake actuator control unit are coupled to a common heat dissipation device. Through the use of a common heat dissipation device for the power electronics systems of the two actuator control units, the design of the brake actuator device can be simplified, and the brake actuator device can thus be produced at lower cost.

In a further specific embodiment, it is provided that the first and the second steering actuator are fashioned in the form of a common electric motor. Here, a first set of windings of the electric motor, supplied with power by the first on-board network, is assigned to the first steering actuator, while a second set of windings of the electric motor, supplied with power by the second on-board network, is assigned to the second steering actuator. The housing of both steering actuators within a common electric motor enables a particularly advantageous alternative to the use of two separate electric motors. Here, in addition to the weight the production costs and space requirement of the two steering actuators can also be significantly reduced.

In a further specific embodiment, it is provided that the first steering actuator is fashioned as part of an electrical power steering system. Through the use of the electrical power steering system as a steering actuator, the actuator system according to the present invention can be realized particularly easily.

In a further specific embodiment, it is provided that the system in addition includes a second brake actuator device operated on the first on-board network, realized at least partly by components of an electronic stability program system. Through the use of existing components of the ESP system, the actuator system according to the present invention can be realized particularly easily in order to retrofit a conventional vehicle for automatic driving.

In addition, the present invention relates to a brake actuator device for an actuator system including a brake actuator, a brake actuator control unit for controlling the brake actuator, and a steering actuator control unit for controlling the steering actuator. Such a brake actuator device can be realized as a compact module that can be incorporated relatively easily into an existing infrastructure of the vehicle. In this way, a conventional vehicle can be upgraded particularly easily to an autonomously driving vehicle.

In a further specific embodiment, it is provided that the brake actuator control unit and the steering actuator control unit are fashioned in the form of a common control device. In this way, both the manufacturing outlay and the constructive size of the brake actuator device can be reduced.

In addition, according to the present invention a vehicle is provided having a corresponding actuator system, the brake actuator device being fashioned in the form of a separate plug-in module. The modular design here enables a particularly simple installation and removal of the brake actuator device in a vehicle. Thus, a conventional vehicle can be prepared relatively easily for automatic driving.

Below, the present invention is described in more detail on the basis of Figures.

BRIEF DESCRIPTION OF THE DRAWINGS

FIG. 4 shows a schematic representation of the brake actuator device fashioned in the form of a plug-in module.

FIG. 5 shows a schematic representation of a vehicle having a brake actuator device fashioned as a plug-in module.

DETAILED DESCRIPTION OF EXAMPLE EMBODIMENTS

Figure 1:
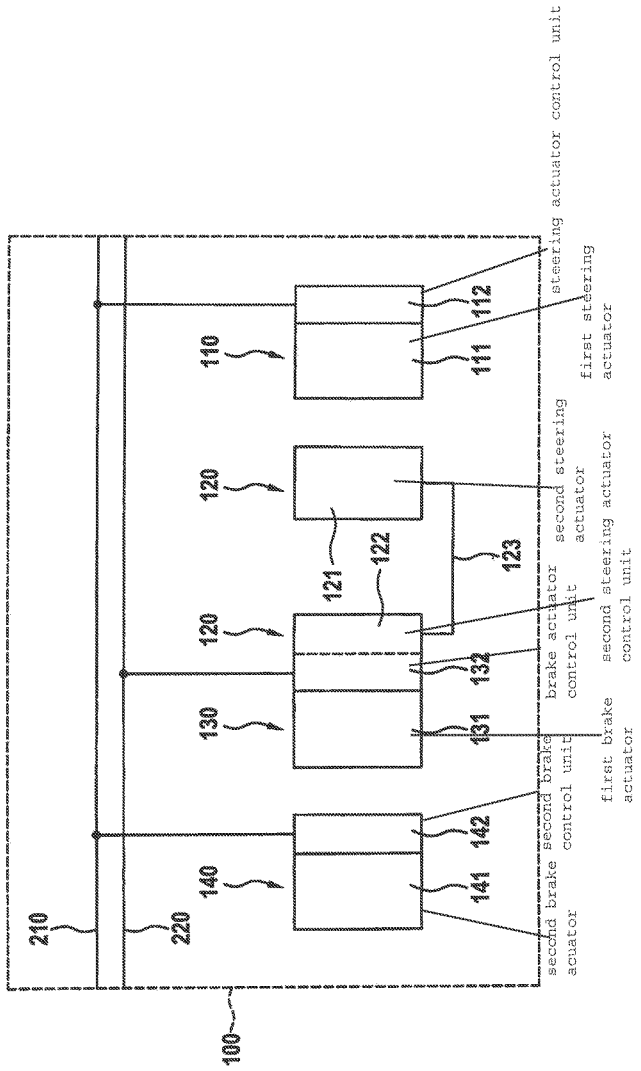
FIG. 1 shows a schematic representation of an actuator system according to the present invention, illustrating the connections of the individual devices to two on-board networks designed to be redundant relative to one another.

In order to retrofit a conventional vehicle to form an AD (Automated Driving) vehicle, the actuator system of the conventional vehicle is equipped with redundant actuators for steering and braking. Here, in a steering drive train in which an electrically controllable steering actuator is already situated, an additional electrically controllable steering actuator is provided. In contrast, in the brake system already equipped with an electrically controllable brake actuator, an additional brake actuator device is integrated, which, in addition to an electrically controllable brake actuator and an associated brake actuator control unit, also has the control unit of the additional electrically controllable steering actuator. Here, the brake actuator device is preferably fashioned in the form of a plug-in module that is preferably installed in the vehicle in exchange for or as a replacement for a conventional brake booster. FIG. 1 schematically shows such an actuator system 100, including a first steering actuator device 110, connected to a first on-board network 210, and having a first electrically controllable steering actuator 111 and an associated steering actuator control unit 112, a second steering actuator device 120, connected to a second on-board network 220, having a second electrically controllable steering actuator 121 and an associated second steering actuator control unit 122, a first brake actuator device 130, connected to the second on-board network 220, having a first brake actuator 131 and an associated control unit 132, and a second brake actuator device 140, connected to the first on-board network 210, having a second brake actuator 141 and an associated control unit 142. As can be seen in FIG. 1, the two steering actuator devices 110, 120, as well as the two brake actuator devices 130, 140, are each operated on different on-board networks 210, 220. In this way, it is ensured that in the case of failure of one of the on-board networks 210, 220, only one of the two redundantly designed actuator devices 110, 120, 130, 140 of steering system 250 and of brake system 260 will fail, so that the continued operation of the relevant system 250, 260 with the respectively remaining actuator device 110, 120, 130, 140 remains ensured.

As is further shown in FIG. 1, steering actuator control unit 122 of second steering actuator device 120 is housed inside first brake actuator device 130, and is connected to second steering actuator 121, situated spatially separately therefrom, for example via so-called power control lines 123. Second steering actuator control unit 122 can, as is shown in FIG. 1, also use the connection of first brake actuator device 130 to second on-board network 220, or can be connected to second on-board network 220 via a separate connection.

The housing of second steering actuator control unit 122 within the housing of first brake actuator device 130 enables a simple retrofitting of the function required for automated driving by installing first brake actuator device 130, preferably designed as a compact plug-in module. Depending on the existing vehicle infrastructure, if necessary second steering actuator 121 may also have to be incorporated into the existing steering system.

It may be advantageous to realize first steering actuator 111 and second steering actuator 121 in the form of a common electric motor. Such an electric motor has separate phases for each of the two steering actuators 111, 121. Thus, for example two steering actuators 111, 121, each fashioned as a three-phase motor, can be replaced by a six-phase electric motor, three of the six phases being assigned respectively to each of the two steering actuators 111, 121. The torque of the common electric motor then results from the superposition of the torques of the two steering actuators 111, 121, and in the case of failure of one of the two steering actuators 111, 121 the electric motor continues to perform its function.

Figure 2:
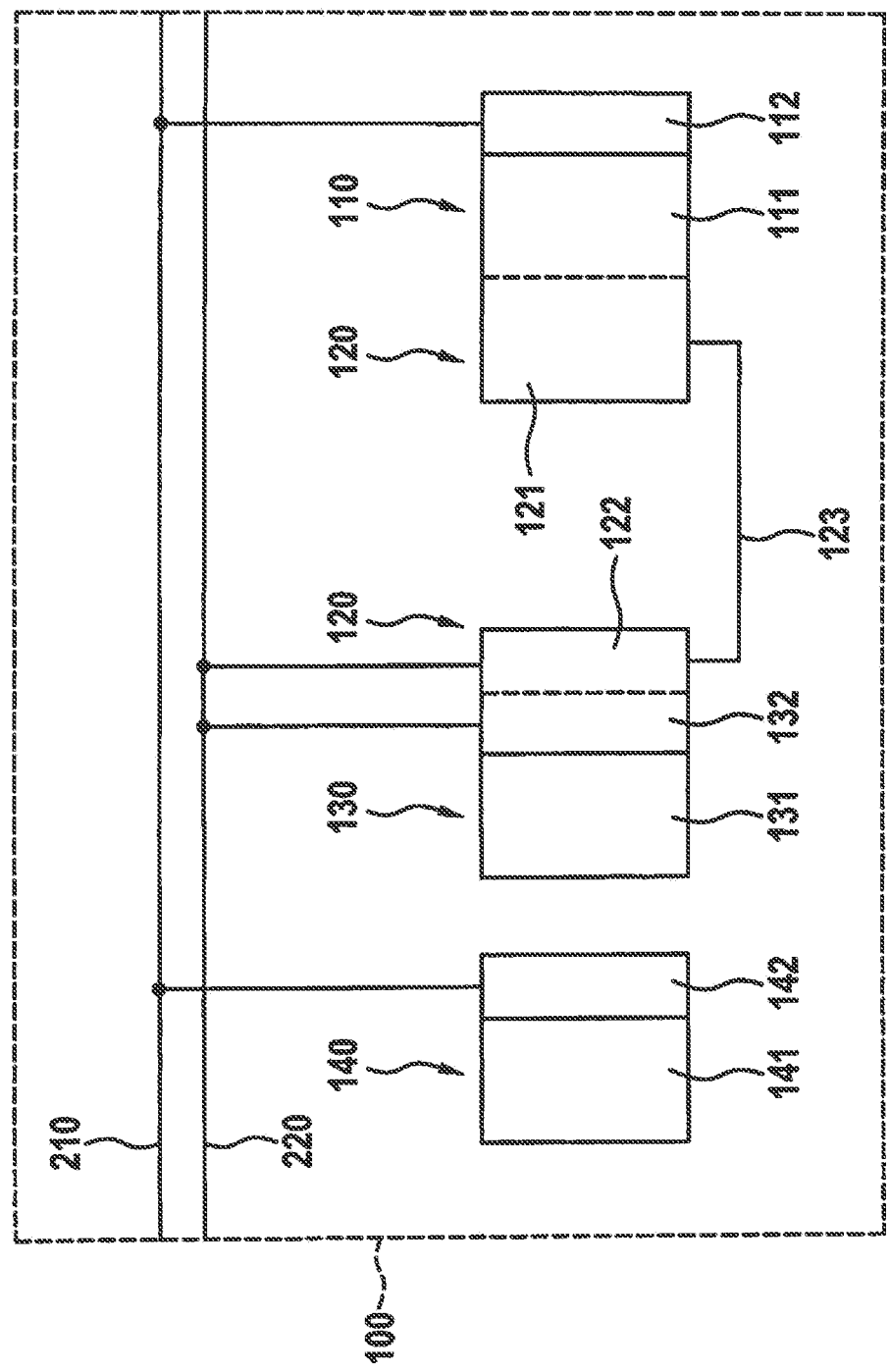
FIG. 2 shows a schematic representation of an alternative actuator system having two steering actuators fashioned in the form of a common electric motor.

FIG. 2 shows a schematic representation of an actuator system 100 having the two steering actuators 111, 121 fashioned in the form of a common electric motor. The advantage of this configuration is that no additional actuator in the form of a separate module in the steering system is required. To produce the automated driving functionality, the three-phase electric motor of an electric power steering module can be replaced by a corresponding six-phase motor. This can also take place already during vehicle assembly, so that the vehicle is prepared for retrofitting for automated driving operation.

Figure 3:
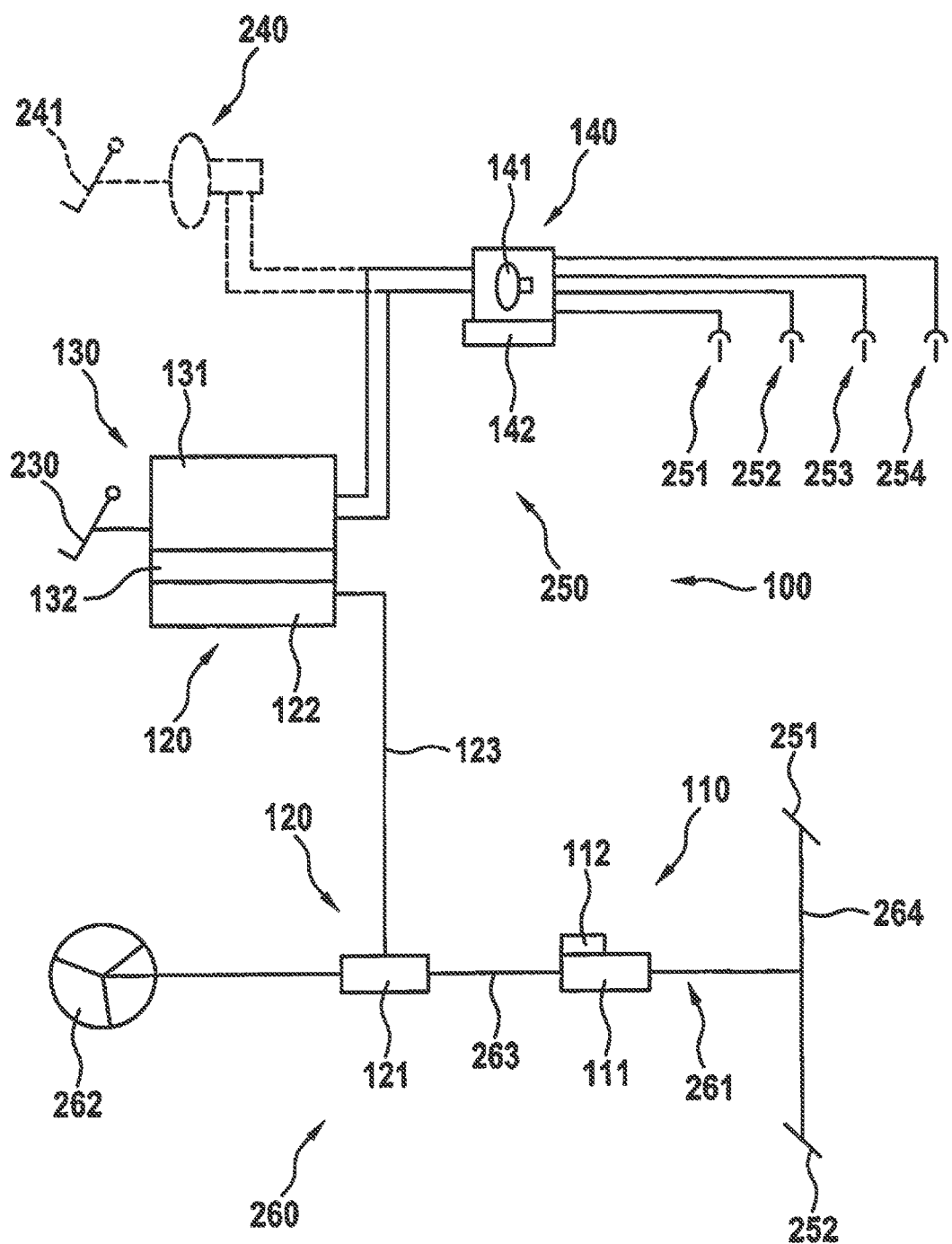
FIG. 3 schematically shows the design of an actuator system according to the present invention having a brake actuator device that replaces the conventional brake booster.

FIG. 3 shows a further schematic representation of actuator system 100 according to the present invention, showing the interaction of the individual actuator devices. As is shown in the lower part of FIG. 3, the two steering actuators 111, 121 are situated in steering train 261, which communicates the steering movements of steering wheel 262 to front wheels 251, 252. The precise position of installation of the two steering actuators 111, 121 is here a function of the respective application, and in the present example is located in the region of steering column 263. However, steering actuators 111, 121 can also be installed at other suitable locations of steering drive train 261, for example in the area of steering rack 264.

As is further shown in FIG. 3, second steering actuator control unit 122 is situated spatially at a distance from second steering actuator 121 in first brake actuator device 130. First brake actuator device 130 is here preferably an electromechanical device that converts a braking request, present as an electrical signal, into a corresponding hydraulic pressure in the brake lines connected thereto. Such a brake actuator device can be realized in the form of a relatively compact actuator plug-in module, for example the so-called iBooster (Robert Bosch GmbH). Such a plug-in module can easily be incorporated into the existing vehicle actuator system. In this function, brake actuator device 130 replaces conventional brake booster 240, shown in FIG. 3 by dashed lines. The input signal for control unit 132 of actuator plug-in module 130 can be provided by an electrical brake pedal. In automated driving operation of the vehicle, brake actuator control unit 132 of actuator plug-in module 130 typically receives corresponding brake commands from a higher-order control device (not shown here).

As second brake actuator device 140, preferably an ESP module is used, already present in modern vehicles. ESP module 140 also includes an electrically operated actuator 141 that converts an electrical brake signal into a corresponding hydraulic pressure. Second brake actuator device 140 is fashioned such that in case of error it assumes a defined state that does not impair the actuation of brakes 251, 252, 253, 254 by first brake actuator device 130. In principle, however, the two brake actuator devices 130, 140 can have separate hydraulic circuits (not shown here).

FIG. 4 schematically shows the design of first brake actuator device 130. Here, brake actuator device 130, fashioned in the form of an actuator plug-in module, has housing 135 in which electromechanical brake actuator 131 is situated. In addition, first brake actuator device 130 also includes brake actuator control unit 132, assigned to brake actuator 131, and second steering actuator control unit 122 assigned to second steering actuator 121; actuator control units 122, 132 can also be situated inside housing 135. Alternatively, one or both actuator control units 132, 122 can also be housed in an additional housing (not shown here) situated on housing 135. Through the common housing, the two actuator control units 132, 122 can also be fashioned in the form of a common control device 133, and the existing infrastructure, such as the power supply, the data interface, or the signal processing or logic can be used in common by both actuator control units 122, 132. Alternatively, the two actuator control units 122, 132 can also be realized in the form of two separate control devices. In case of error, this simplifies the exchange of the relevant control device.

Through this common situation, second steering actuator control unit 122 and first brake actuator control unit 132 can in addition be connected to a common heat dissipation device 134. This can be a passive heat dissipation device, such as cooling ribs, or an active cooling system. An advantage of this configuration is that, in a correspondingly adapted heat management system, a significantly lower cooling expense can be achieved for common control device 133.

FIG. 5 schematically shows a vehicle 200 having first brake actuator device 130 situated, preferably, in the engine compartment of vehicle 200, as part of actuator system 100. Brake actuator device 130, acting as a replacement for a conventional brake booster, is installed into existing actuator system 100 of vehicle 200 as a plug-in module, and retrofits vehicle 200 for automated driving operation.

Through the integration of the steering redundancy into the brake actuator system, the homogeneity in the steering is broken up.

First steering actuator device 110 can be fashioned for example in the form of an electrical steering system (EPS=Electric Power Steering). The EPS can be designed such that it performs standard steering maneuvers itself. In case of extreme demands, however, the ESP can request support from the plug-in via bus.

Although in the foregoing the present invention has been described on the basis of concrete exemplary embodiments, it is in no way limited thereto. A person skilled in the art will thus suitably modify the described features and combine them with one another without departing from the core idea of the present invention.

What is claimed is:

1. An actuator system for a vehicle, comprising:
    a first steering actuator, operated on a first on-board network of the vehicle, and a first steering actuator control unit, operated on the first on-board network, for controlling the first steering actuator;
    a second steering actuator, operated on a second on-board network of the vehicle that is designed to be redundant in relation to the first on-board network; and
    a brake actuator device, operated on the second on-board network of the vehicle, having a brake actuator and a brake actuator control unit for controlling the brake actuator, the brake actuator device including a second steering actuator control unit, operated on the second on-board network of the vehicle, for controlling the second steering actuator.

2. The actuator system as recited in claim 1, wherein the brake actuator device includes a housing that accommodates the brake actuator and the brake actuator control unit assigned to the brake actuator, and the second steering actuator control unit being situated inside the housing.

3. The actuator system as recited in claim 1, wherein the second steering actuator control unit is at least partly integral with the brake actuator control unit assigned to the brake actuator.

4. The actuator system as recited in claim 1, wherein the second steering actuator control unit and the brake actuator control unit each have a separate power electronics system, and the power electronics system of the second steering actuator control unit and the power electronics system of the brake actuator control unit are coupled to a common heat dissipation device.

5. The actuator system as recited in claim 1, wherein the first and second steering actuator are in the form of a common electric motor, a first set of windings of the common electric motor, supplied with power by the first on-board network, being assigned to the first steering actuator, and a second set of windings of the common electric motor, supplied with power by the second on-board network, being assigned to the second steering actuator.

6. The actuator system as recited in claim 1, wherein the first steering actuator is part of an electrical power steering system.

7. The actuator system as recited in claim 1, further comprising:
   a second brake actuator device operated on the first on-board network.

8. A brake actuator device for an actuator system, the actuator system including a first steering actuator, operated on a first on-board network of the vehicle, and a first steering actuator control unit, operated on the first on-board network, for controlling the first steering actuator, a second steering actuator, operated on a second on-board network of the vehicle that is designed to be redundant in relation to the first on-board network, the brake actuator device comprising:
   a brake actuator;
   a brake actuator control unit for controlling the brake actuator; and
   a steering actuator control unit for controlling the second steering actuator.

9. A brake actuator device for an actuator system, the actuator system including a first steering actuator, operated on a first on-board network of the vehicle, and a first steering actuator control unit, operated on the first on-board network, for controlling the first steering actuator, a second steering actuator, operated on a second on-board network of the vehicle that is designed to be redundant in relation to the first on-board network, the brake actuator device comprising:
   a brake actuator;
   a brake actuator control unit for controlling the brake actuator; and
   a steering actuator control unit for controlling the second steering actuator;
   wherein the brake actuator control unit and the steering actuator control unit are in the form of a common control device.

10. A vehicle having an actuator system, the actuator system comprising:
   a first steering actuator, operated on a first on-board network of the vehicle, and a first steering actuator control unit, operated on the first on-board network, for controlling the first steering actuator;
   a second steering actuator, operated on a second on-board network of the vehicle that is designed to be redundant in relation to the first on-board network; and
   a brake actuator device, operated on the second on-board network of the vehicle, having a brake actuator and a brake actuator control unit for controlling the brake actuator, the brake actuator device including a second steering actuator control unit, operated on the second on-board network of the vehicle, for controlling the second steering actuator;
   wherein the brake actuator device is a separate plug-in module.

* * * * *